United States Patent [19]
Sugawara

[11] Patent Number: 5,969,875
[45] Date of Patent: Oct. 19, 1999

[54] PROJECTING OPTICAL SYSTEM

[75] Inventor: Saburo Sugawara, Kawasaki, Japan

[73] Assignee: Canon Kabushiki Kaisha, Tokyo, Japan

[21] Appl. No.: 08/962,430

[22] Filed: Oct. 31, 1997

[30] Foreign Application Priority Data

Nov. 8, 1996 [JP] Japan .................................. 8-312882

[51] Int. Cl.$^6$ .................................................. G02B 3/00
[52] U.S. Cl. ................................................... 359/651
[58] Field of Search .................................. 359/649, 650, 359/651, 680, 681, 682

[56] References Cited

U.S. PATENT DOCUMENTS

| | | | |
|---|---|---|---|
| 5,257,134 | 10/1993 | Sugawara | 359/679 |
| 5,303,088 | 4/1994 | Sugawara | 359/753 |
| 5,550,679 | 8/1996 | Sugawara | 359/689 |
| 5,552,938 | 9/1996 | Sugawara | 359/691 |
| 5,600,490 | 2/1997 | Sugawara et al. | 359/690 |

FOREIGN PATENT DOCUMENTS 6-265842  9/1994  Japan .

*Primary Examiner*—Georgia Epps
*Assistant Examiner*—John Woolner
*Attorney, Agent, or Firm*—Fitzpatrick, Cella, Harper & Scinto

[57] ABSTRACT

A projecting optical system includes, in order from the side of a screen, a first lens unit of positive refractive power of retrofocus type and a second lens unit composed of one positive lens, wherein parameters of the projecting optical system are determined such that an off-axial principal ray crosses an optical axis between the first lens unit and the second lens unit, and the following condition is satisfied:

$$0.2 < D2f/f < 0.95 < \tag{1}$$

where D2f is a distance from a vertex of a lens surface facing the screen side of the second lens unit to an original-image display plane, and f is a focal length of the projecting optical system.

22 Claims, 14 Drawing Sheets

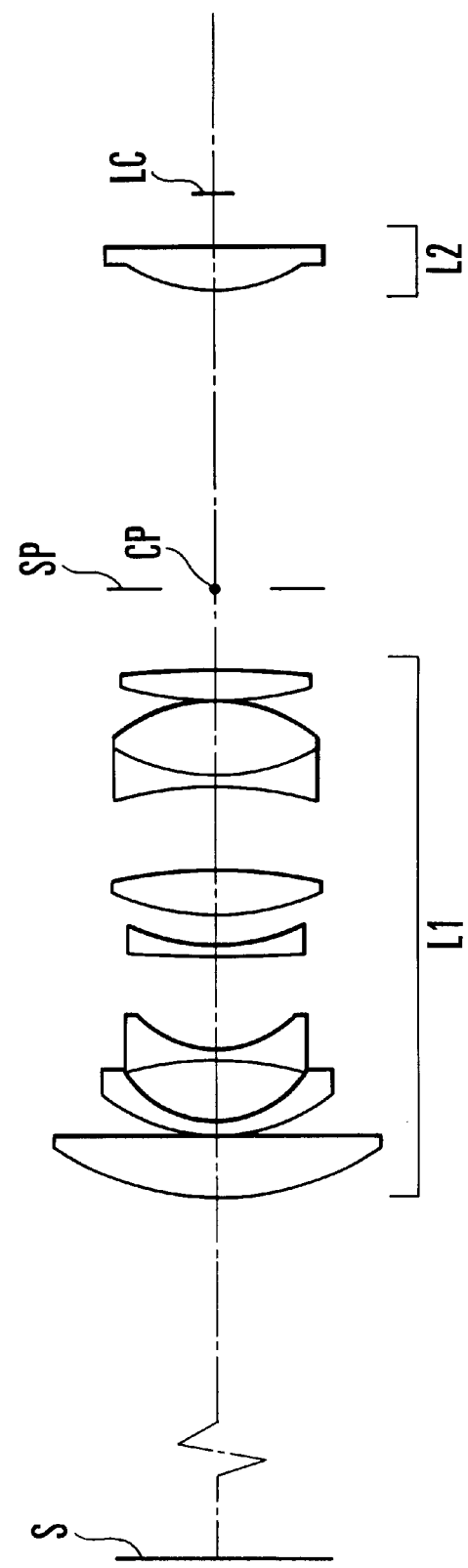

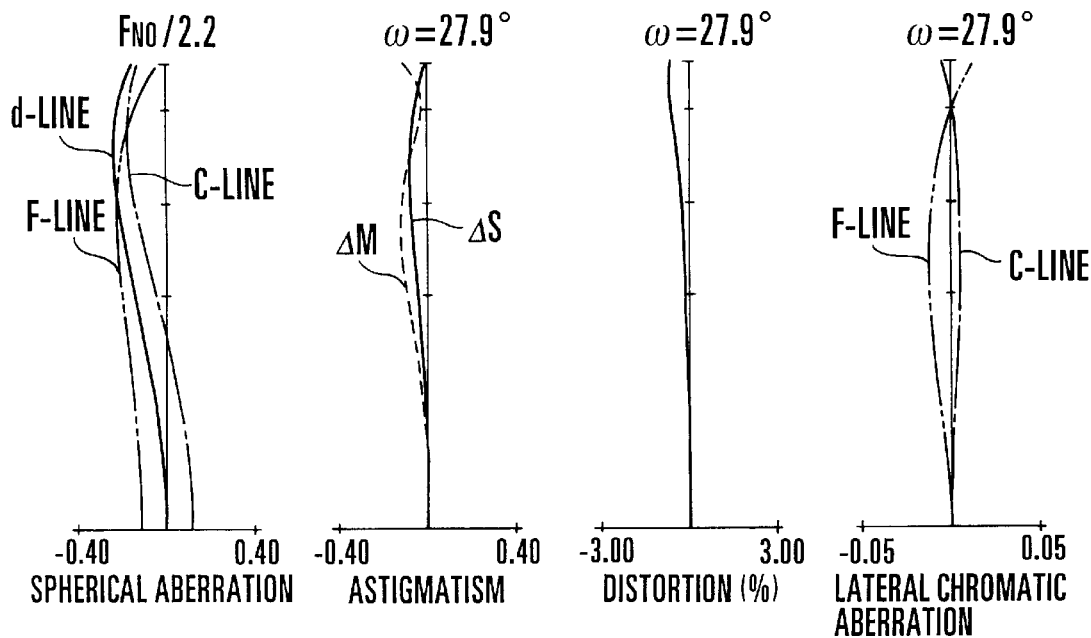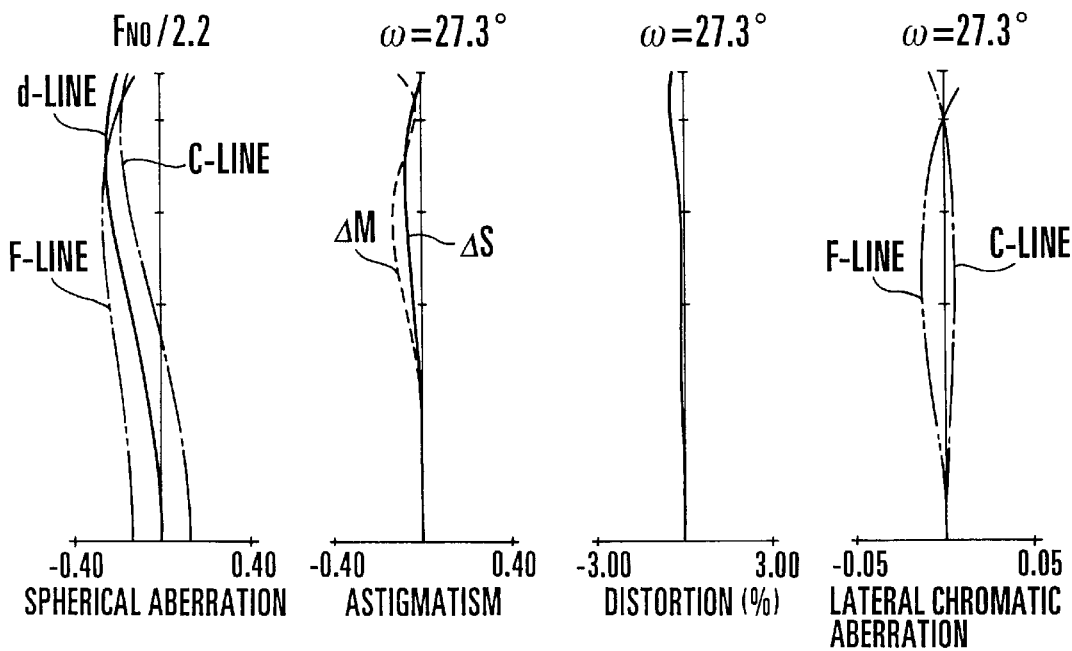

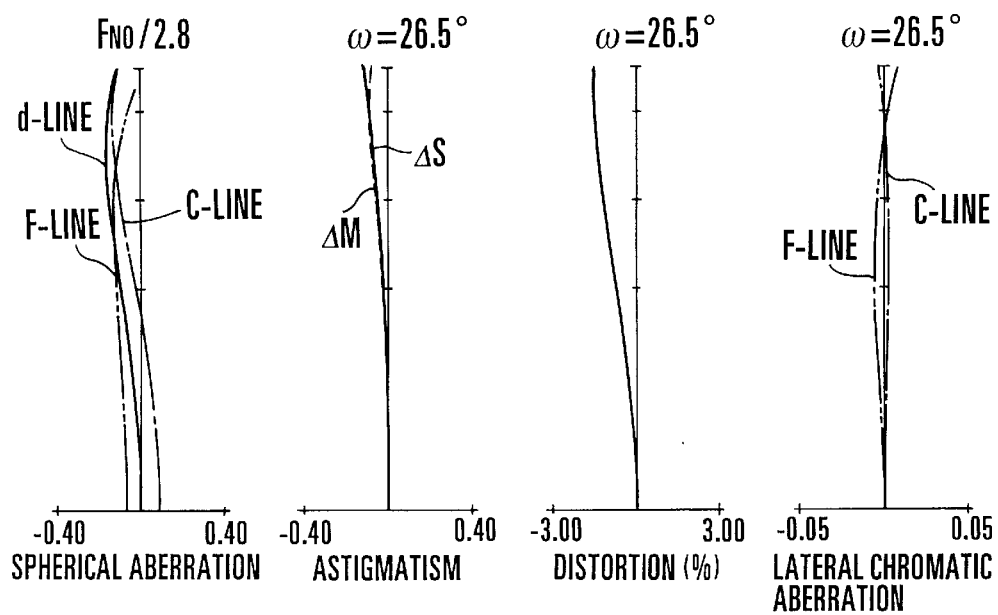

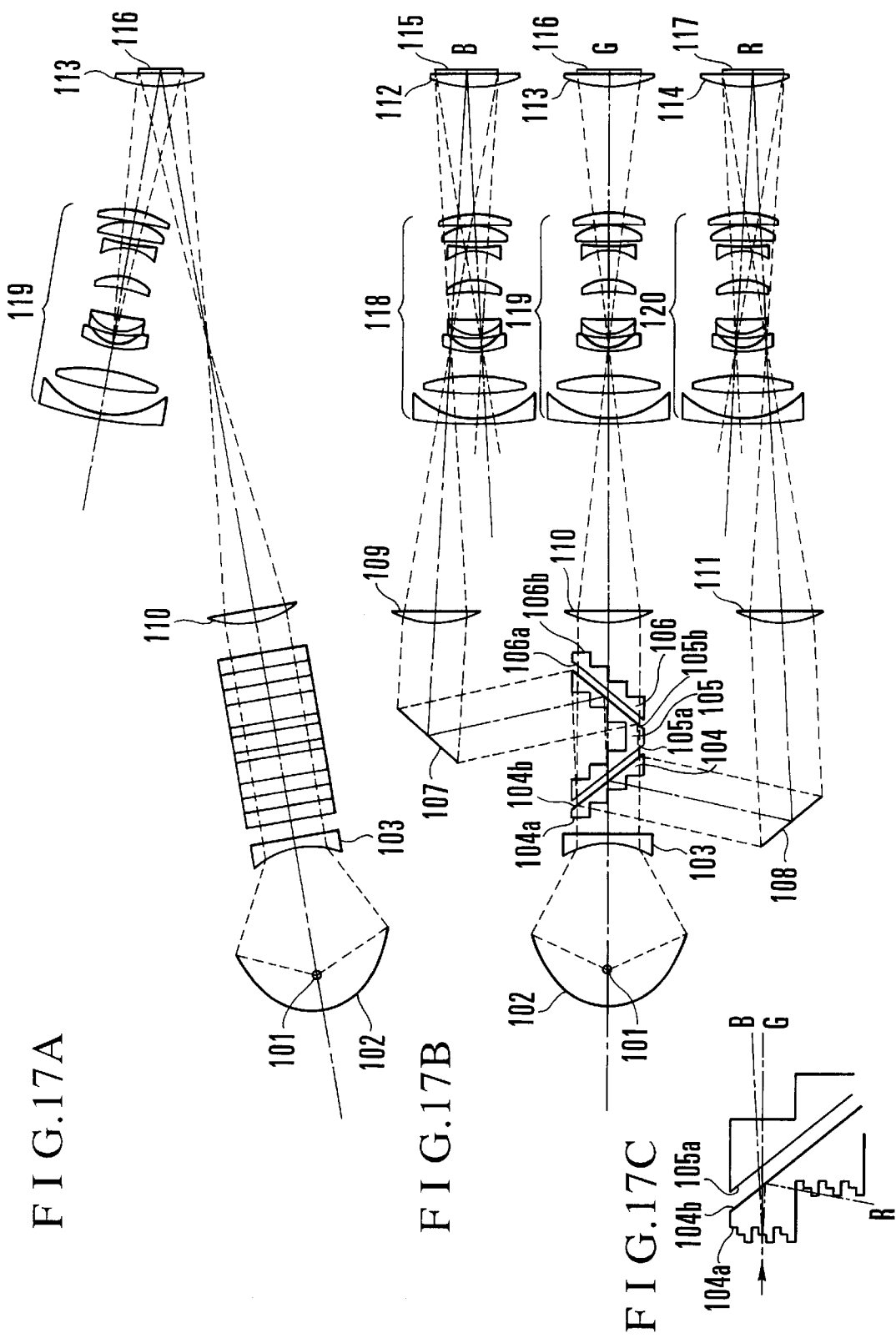

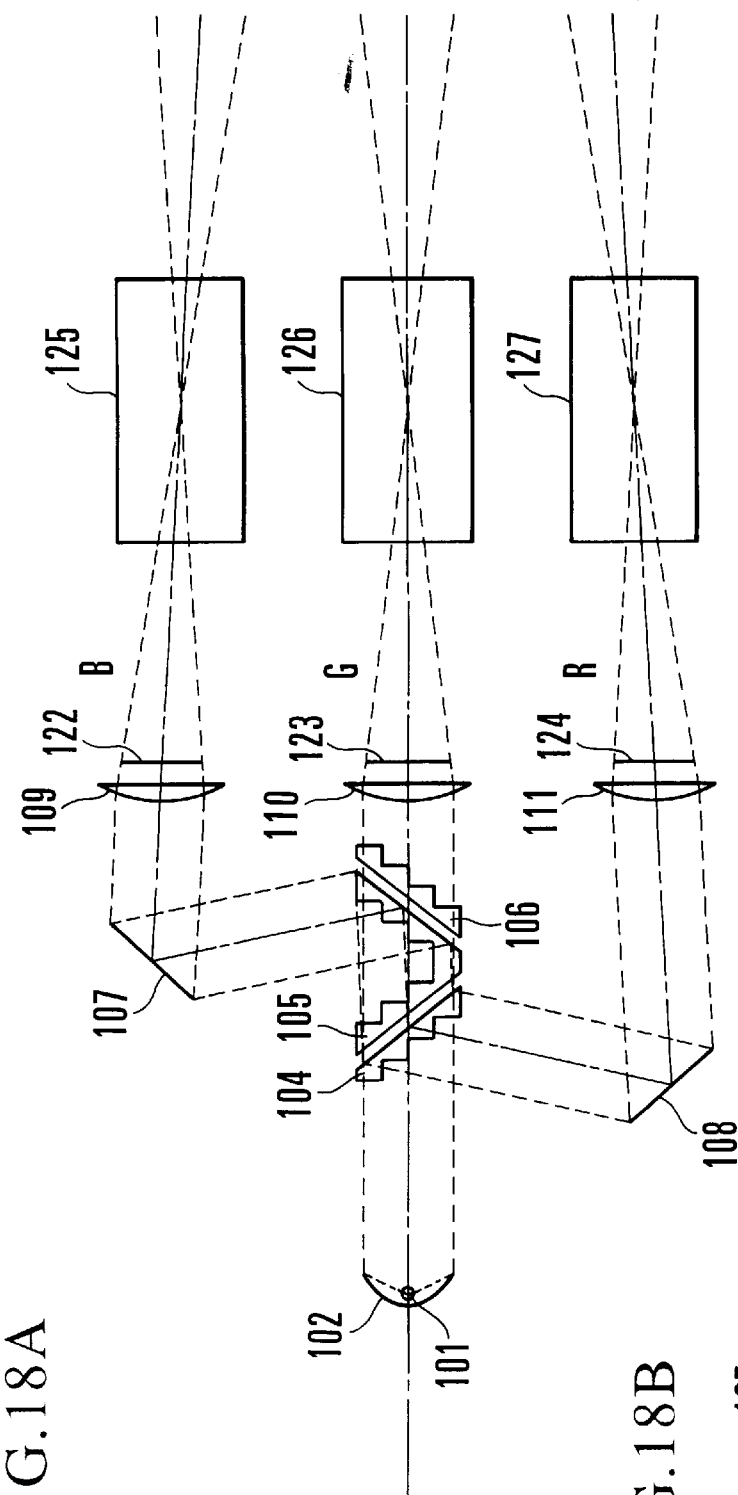
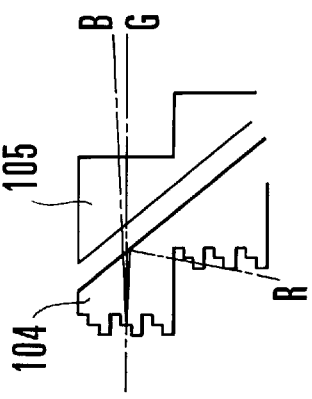
FIG.18A
FIG.18B

PROJECTING OPTICAL SYSTEM

BACKGROUND OF THE INVENTION

1. Field of the Invention

The present invention relates to a projecting optical system and a projection apparatus using the same and, more particularly, to a projecting optical system whose constituent lenses are appropriately designed so as to project, in an enlarged scale, an original image displayed on an image modulating element, for example, a liquid crystal panel (liquid crystal display element), onto a screen and which is suited to a liquid crystal projector while maintaining a good telecentric form and having a high optical performance.

2. Description of Related Art

Heretofore, there have been proposed various projecting optical systems and projection apparatus using the same, which each project in an enlarged scale an original image, such as an image on a film or on a liquid crystal light bulb, onto a screen.

For the projecting optical system, a wide variety of types of optical systems have been used. In the case of a projecting optical system using a color liquid crystal display as an original image to be projected, there is a demand for an elongated back focal distance because the space between the last lens surface and the liquid crystal display elements (back focal distance) must accommodate an optical member such as a reflecting mirror or a dichroic mirror. For this reason, the type in which a lens unit of negative refractive power leads, i.e., the retrofocus type, is used in most projecting optical systems for color liquid crystal display.

FIG. 16 is a schematic diagram showing the main parts of a projection apparatus using a reflection-type liquid crystal display device, as proposed in Japanese Laid-Open Patent Application No. Hei 6-265842. The projection apparatus shown in FIG. 16 includes, in order from the side of a screen 19, a projection lens 18 for projecting original images onto the screen 19, a stop 32, a plano-convex lens 33 having a convex surface facing the screen 19, and a cross dichroic prism 34 for three-color separation.

Images to be projected in different colors, for example, red, green and blue, are formed in liquid crystal panels 13, 14 and 15 of the reflection type, respectively. A reflecting mirror 31 occupies a half of the aperture opening of the stop 32 to introduce illumination light for illuminating the liquid crystal panels 13, 14 and 15.

Light emitted from a light source (incandescent lamp) 1 advances directly or after being reflected by a reflector 2 toward a mirror 20 and, then, is reflected by the mirror 20. The reflected light is condensed by a condenser lens 30 and, then, is reflected by the reflecting mirror 31 disposed in the aperture of the stop 32. The light reflected by the reflecting mirror 31 is guided to the plano-convex lens 33 and, then, is collimated by the plano-convex lens 33. The collimated light is separated by the cross dichroic prism 34 into light beams of three colors, i.e., red, green and blue. Then, the reflection-type liquid crystal panels 13, 14 and 15 are illuminated with the light beams of the three wavelength regions.

Light beams modulated by the reflection-type liquid crystal panels 13, 14 and 15 are combined in color by the cross dichroic prism 34. The combined light beams are condensed by the plano-convex lens 33, are transmitted through the aperture of the stop 32 and are guided to the projection lens 18. The projection lens 18 projects onto the screen 19 the color-combined light beams from the liquid crystal panels 13, 14 and 15.

In general, a projection apparatus using the liquid crystal panels as original images to be projected is provided with a color separating means (cross dichroic prism, dichroic mirrors, or the like) between the projecting optical system (projection lens) and the liquid crystal panels. For this reason, the projecting optical system needs a long back focal distance.

Meanwhile, in order to prevent the unevenness of colors on the screen from occurring, it is necessary to make constant the angles of incidence on the dichroic surfaces of the color separation prism at any point in the original images to be projected. Since the liquid crystal panel has the angle response characteristic, it is also required to make small the angles of incidence of the off-axial rays on the display surfaces. For example, it is necessary to make the off-axial rays incident on the display surface almost at right angles.

Because of the existence of such requirements, the use of the liquid crystal panels as the original images to be projected leads to the necessity of constructing the optical system in the form of the retrofocus type to increase the back focal distance and in the form of an image-side telecentric system.

However, with the projecting optical system constructed in the form of the retrofocus type, the lens system becomes asymmetric, so that various aberrations increase greatly, thereby making a good optical performance difficult to obtain. Also, the use of the image-side telecentric system causes an increase of the number of lens elements, producing another problem in that the entire lens system becomes complex in structure and increases in size.

Also, the projection apparatus using the cross dichroic prism as the color separating means has the following problems:

(i) As the number of layers in the coating of the cross dichroic prism is 20 or thereabout at the lowest, the spectral characteristic differs greatly from item to item. In terms of manufacturing, therefore, the spectral characteristic is difficult to keep at a certain level.

(ii) The prism elements constituting the cross dichroic prism must be assembled at a high angular accuracy. Otherwise, the projected image would be split double.

(iii) On one hand, the cross dichroic prism lies just before the liquid crystal panels. To illuminate the liquid crystal panels, on the other hand, the light beams to be used have to be collimated. The plano-convex lens is, therefore, positioned a long distance away from the liquid crystal panels. Therefore, the light beam passing through the plano-convex lens increases in diameter, causing correction of astigmatism and coma to become difficult.

BRIEF SUMMARY OF THE INVENTION

The present invention sets forth appropriate rules of lens design to easily obtain a certain back focal distance and correct well the asymmetric aberrations due to the telecentric form of the image-side section. It is, therefore, an object of the invention to provide a projecting optical system suited to be used in a projection apparatus (for example, a color liquid crystal projector.)

Further, the present invention gives appropriate rules of design for the illuminating means for illuminating the original images to be projected, such as those of liquid crystal panels. Therefore, another object of the invention is to provide a projection apparatus capable of projecting an image onto the screen with a high optical performance.

In accordance with an aspect of the invention, there is provided a projecting optical system which comprises, in order from a first conjugate point of a longer distance, a first lens unit of positive refractive power of retrofocus type and a second lens unit composed of one positive lens, wherein parameters of said projecting optical system are determined such that an off-axial principal ray crosses an optical axis between the first lens unit and the second lens unit, and the following condition is satisfied:

$$0.2 < D2f/f < 0.95 \qquad (1)$$

where $D2f$ is a distance from a vertex of a lens surface facing the first conjugate point of the second lens unit to a second conjugate point of a shorter distance, and f is a focal length of the projecting optical system.

In accordance with another aspect of the invention, there is provided a projecting optical system which comprises, in order from a first conjugate point of a longer distance, a first lens unit of positive refractive power of retrofocus type and a second lens unit composed of one positive lens, wherein parameters of said projecting optical system are determined such that an off-axial principal ray crosses an optical axis between the first lens unit and the second lens unit, and the second lens unit is provided with at least one aspheric surface.

Also, in accordance with a further aspect of the invention, there is provided a projection apparatus using the above projecting optical system. In the projection apparatus, a light beam from a light source is divided in angle into three color light beams by a diffracting optical element provided on an entrance surface of a first prism. Of the three color light beams, the first light beam is then totally reflected by an exit surface of the first prism to illuminate a first image modulating element. The second and third color light beams of the three color light beams exit from the exit surface of the first prism and enter a second prism of stepped form. Then, the second color light beam is totally reflected by an exit surface of the second prism to illuminate a second image modulating element. The third color light beam exits from the exit surface of the second prism to illuminate a third image modulating element. Images displayed on the first, second and third image modulating elements are projected onto a predetermined plane by the projecting optical system.

The above and further objects and features of the invention will become apparent from the following detailed description of the preferred embodiments thereof taken in conjunction with the accompanying drawings.

BRIEF DESCRIPTION OF THE SEVERAL VIEWS OF THE DRAWING

FIG. 5 is a lens block diagram of a numerical example 5 of the projecting optical system of the invention.

FIGS. 6A to 6D are graphic representations of the aberrations of the numerical example 1 of the projecting optical system of the invention when the magnification is 1/40.95.

FIGS. 7A to 7D are graphic representations of the aberrations of the numerical example 2 of the projecting optical system of the invention when the magnification is 1/40.95.

FIGS. 10A to 10D are graphic representations of the aberrations of the numerical example 5 of the projecting optical system of the invention when the magnification is 1/35.24.

FIGS. 17A to 17C are schematic diagrams of the main parts of a second embodiment of the projection apparatus according to the invention.

FIGS. 18A and 18B are schematic diagrams of the main parts of a third embodiment of the projection apparatus according to the invention.

DETAILED DESCRIPTION OF THE INVENTION

Figure 1:
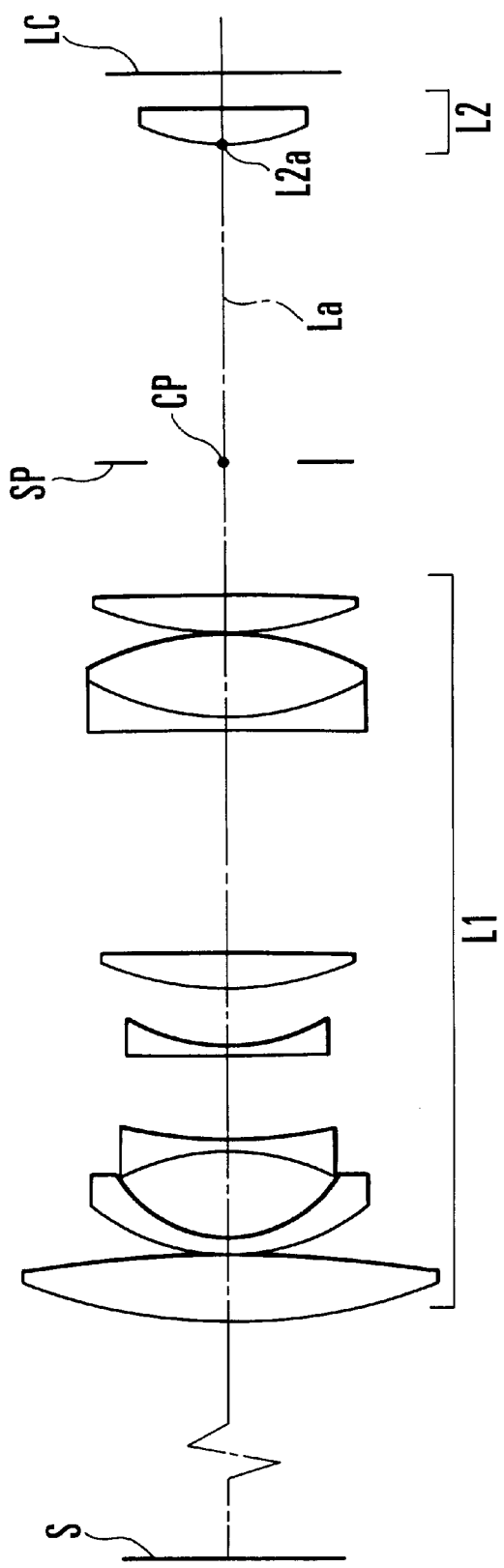
FIG. 1 is a lens block diagram of a numerical example 1 of the projecting optical system of the invention.
Figure 2:
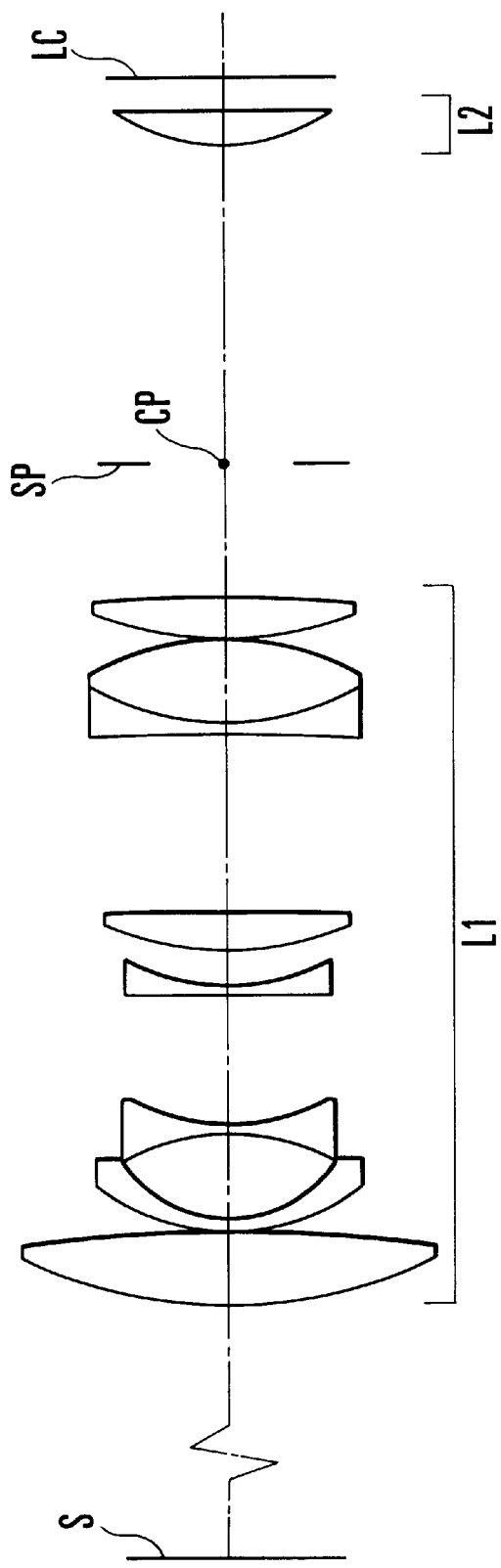
FIG. 2 is a lens block diagram of a numerical example 2 of the projecting optical system of the invention.
Figure 3:
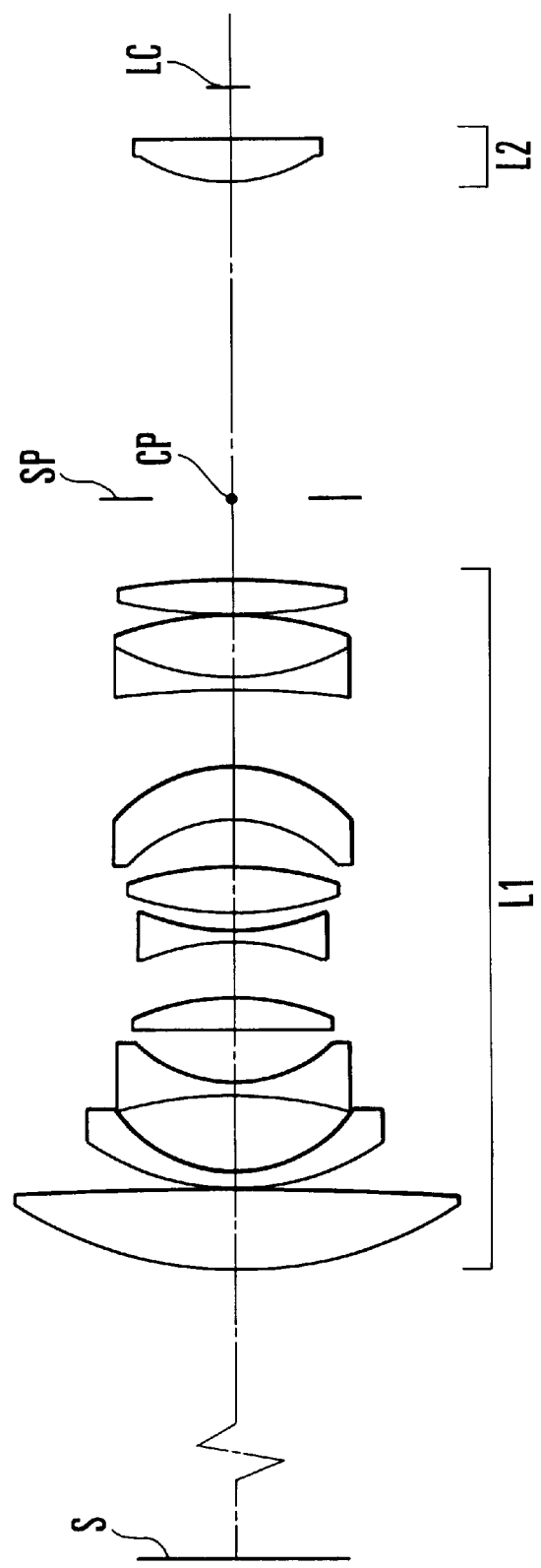
FIG. 3 is a lens block diagram of a numerical example 3 of the projecting optical system of the invention.
Figure 4:
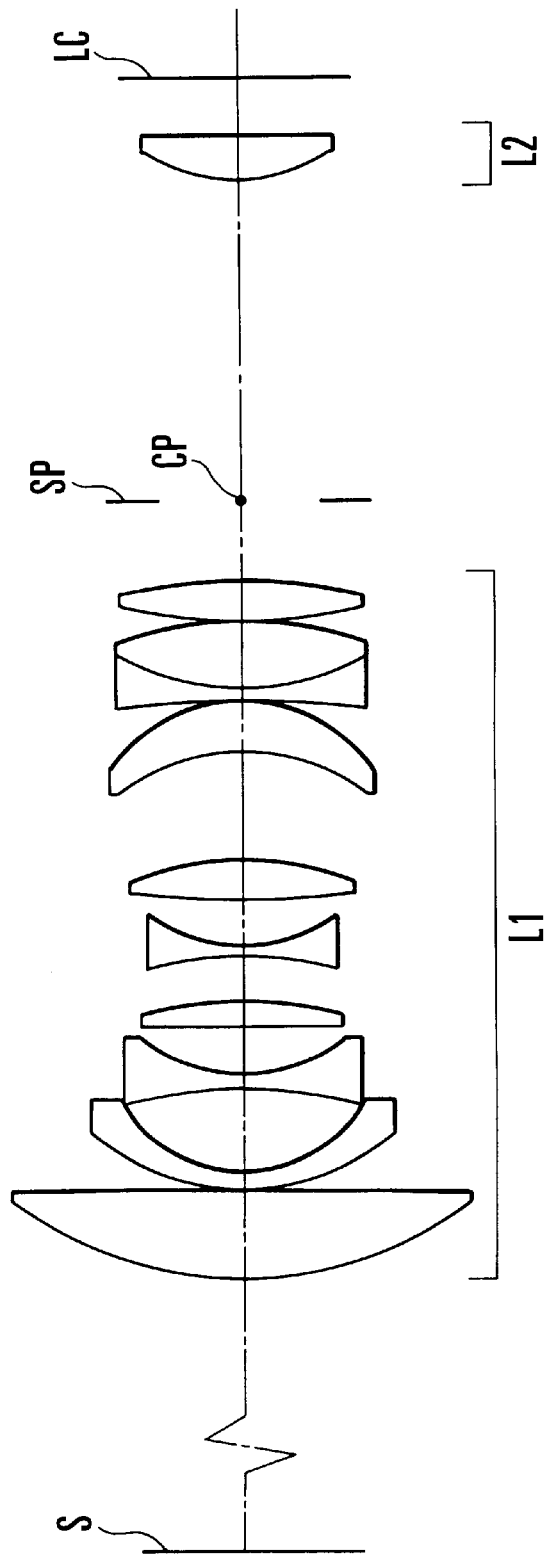
FIG. 4 is a lens block diagram of a numerical example 4 of the projecting optical system of the invention.
Figures 8A, 8B, 8C, 8D:
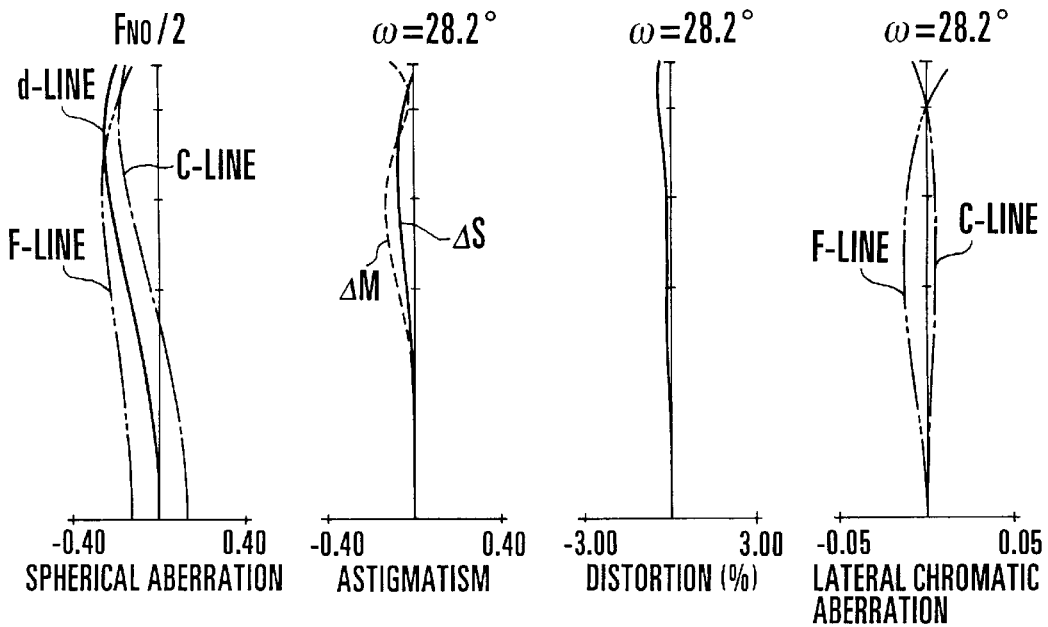
FIGS. 8A to 8D are graphic representations of the aberrations of the numerical example 3 of the projecting optical system of the invention when the magnification is 1/35.24.
Figures 9A, 9B, 9C, 9D:
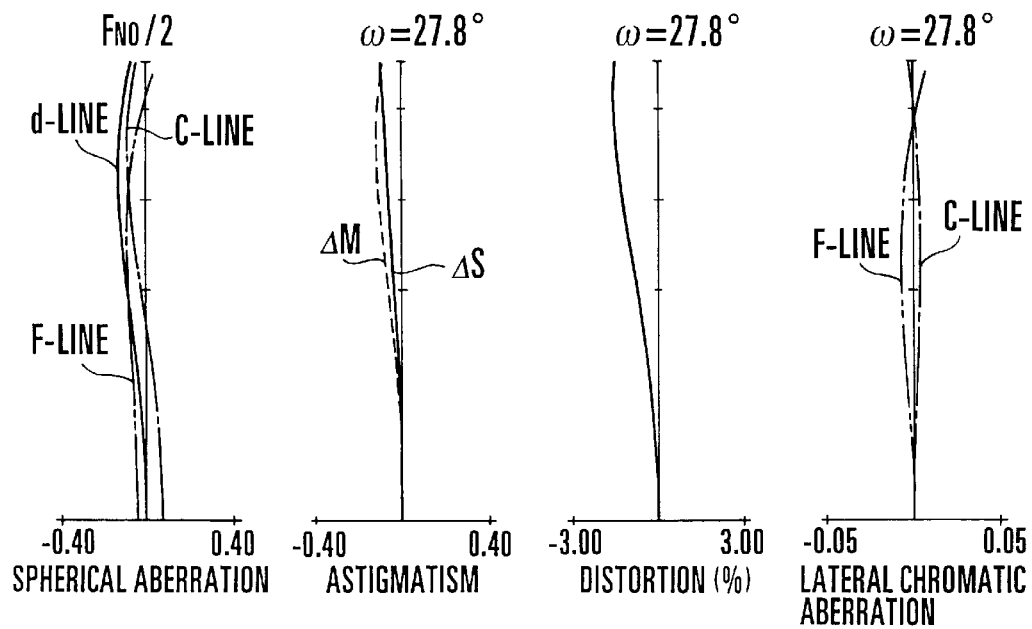
FIGS. 9A to 9D are graphic representations of the aberrations of the numerical example 4 of the projecting optical system of the invention when the magnification is 1/35.24.
Figure 11:
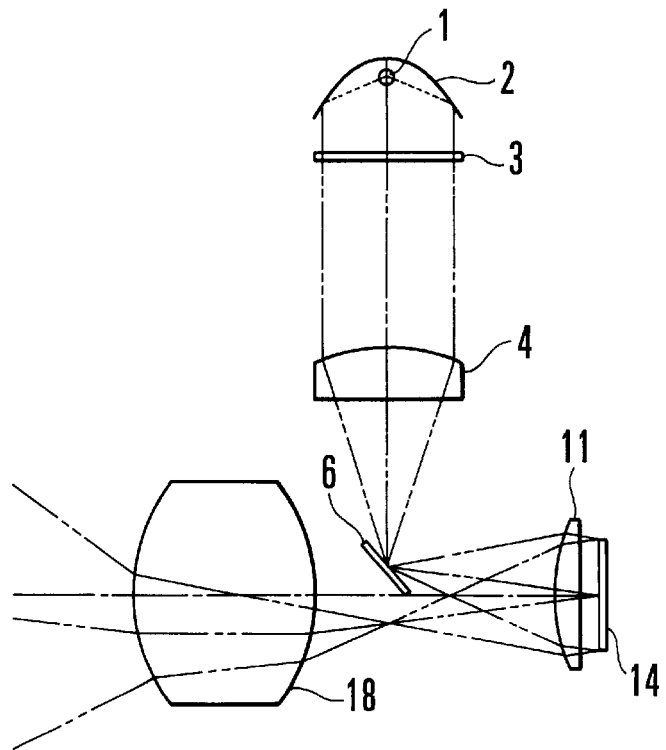
FIG. 11 is a side view of the main parts of a first embodiment of the projection apparatus according to the invention.

Hereinafter, preferred embodiments of the invention will be described in detail with reference to the drawings.

FIG. 1 to FIG. 5 are lens block diagrams showing the numerical examples 1 to 5 of the projecting optical system of the invention, respectively. FIGS. 6A to 6D and FIGS. 7A to 7D show the aberrations of the numerical examples 1 and 2, respectively, of the projecting optical system of the invention when the magnification is 1/40.95. FIGS. 8A to 8D to FIGS. 10A to 10D show the aberrations of the numerical example 3 to 5, respectively, of the projecting optical system of the invention when the magnification is 1/35.24. FIG. 11 to FIG. 14 are side, back, top and bottom views, respectively, showing the main parts of a first embodiment of the projection apparatus according to the invention. FIG. 15 is a perspective view of the main parts of the first embodiment of the projection apparatus according to the invention. First, the features of the projecting optical system according to the invention will be described with reference to FIGS. 1 to 5.

In FIGS. 1 to 5, L1 denotes a first lens unit of positive refractive power of retrofocus type. L2 denotes a second lens unit composed of one positive lens. SP stands for a stop. CP denotes a point at which an off-axial principal ray crosses an optical axis La. S denotes a screen, which is disposed at a first conjugate point of a longer distance (hereinafter also referred to as the "object side"). LC denotes a plane to be projected of a liquid crystal display element (liquid crystal panel) or the like, which is disposed at a second conjugate point of a shorter distance (hereinafter also referred to as the "image side"). L2a denotes a vertex of the lens surface facing the first conjugate point side of the second lens unit L2.

On the image side, there are arranged, in the case of, for example, the color liquid crystal projection apparatus as shown in FIGS. 11 to 15, the liquid crystal elements which display the images to be projected, the light source, filters or like elements.

In the present embodiment, the first lens unit L1 is constructed from a lens system of positive refractive power in the form of the retrofocus type, thereby obtaining a separation somewhat longer than necessary to accommodate a color combining system between the first lens unit L1 and the second lens unit L2. The separation between the first lens unit L1 and that conjugate point of the first lens unit L1 which is nearer to the second conjugate point is made large. Also, the focal length of the entire projecting optical system is shortened. Accordingly, when used in the projection apparatus (liquid crystal projector), a large projected image is obtained at a short projection distance.

The second lens unit L2, when the projecting optical system is used in the projection apparatus, makes parallel the light rays from a high reflection mirror serving as an illumination-light introducing means disposed between the first lens unit L1 and the second lens unit L2 as shown in FIGS. 11 to 15. Such collimated light rays are made incident on the liquid crystal panels.

While the high reflection mirror for the introduction of the illumination light is disposed above the cross point CP of the off-axial principal ray with the optical axis, another high reflection mirror for color combination is disposed below the point CP. As a primary image of the light source is formed on the high reflection mirror for the introduction of the illumination light, the second lens unit L2 and the liquid crystal panel of the reflection type form a secondary image of the light source at a position symmetric with respect to the optical axis. The projected image on the screen is thus freed from any unevenness of illumination.

In the present embodiment, determination of the various parameters such as the refractive powers of the first lens unit L1 and the second lens unit L2 and the position of the stop SP is made so that the off-axial principal ray crosses the optical axis at the point CP, which is located between the first lens unit L1 and the second lens unit L2.

Within such a framework, letting the distance between the vertex of the lens surface facing the first conjugate point of the second lens unit L2 and the second conjugate point of a shorter distance be denoted by D2f, and the focal length of the entire projecting system be denoted by f, the aforesaid condition (1) is satisfied. This arrangement fulfills the requirements of simplifying the entirety of the projection apparatus and of forming a good image on the screen.

The technical significance of the condition (1) is explained below. The inequalities of condition (1) give a range for the ratio of the distance from the vertex of the lens surface facing the first conjugate point of the second lens unit to the second conjugate point to the focal length of the entire projecting optical system. In a range below the lower limit of the condition (1), as this means that the second lens unit is too close to the second conjugate point (liquid crystal panel), the dust or foreign particles on the lens surfaces of the second lens unit become appreciable on the screen. In another range above the upper limit of the condition (1), as this means that the diameter of the light beam passing through the second lens unit is too large, the difficulty of correcting astigmatism and coma increases objectionably.

Also, the second lens unit is disposed close to the second conjugate point (liquid crystal panel), thereby decreasing the aberrations due to the second lens unit. Incidentally, in terms of correction of the aberrations, it is more preferable to alter the condition (1) as follows:

$$0.3 < D2f/f < 0.9 \qquad (1a).$$

Also, within the aforesaid framework, at least one aspheric surface is applied to the second lens unit. By this aspheric surface, the optical performance is kept good over the entire area of a frame for the projected image on the screen.

To facilitate the increase of the back focal distance of the projecting optical system to a predetermined value, while still permitting the off-axial aberrations and other aberrations to be corrected well and the optical performance to be corrected in good balance over the entire area of the frame, it is preferable to satisfy at least one of the following features or conditions:

The one positive lens of the second lens unit is a plano-convex lens having a convex surface facing the first conjugate point. By this arrangement, the reflected light rays from the primary image of the light source is diverged to lessen the entering of them to the color separating system, so that ghost due to the light source image is reduced as far as possible.

The one positive lens of the second lens unit has an aspheric surface of such shape that the positive refractive power becomes progressively weaker from the center of the lens toward the margin. By this arrangement, the condensing of the light rays to the secondary light source image is improved to obtain a brighter projected image.

A lens surface facing the first conjugate point of the one positive lens in the second lens unit is hyperboloidal. In this instance, a good range of conical constants is between −1.3 and −3.

The first lens unit comprises, in order from the first conjugate point, a positive lens, a negative lens of meniscus form convex toward the first conjugate point, a negative lens of which both surfaces are concave, a negative lens having a concave surface facing the second conjugate point, a positive lens, a cemented lens composed of a negative lens and a positive lens and having an overall positive refractive power, and a positive lens.

The first lens unit comprises, in order from the first conjugate point, a positive lens, a negative lens of meniscus form convex toward the first conjugate point, a negative lens of which both surfaces are concave, a positive lens, a negative lens of which both surfaces are concave, a positive lens of which both surfaces are convex, a lens having a convex surface facing the second conjugate point, a cemented lens composed of a negative lens and a positive lens and having an overall positive refractive power, and a positive lens.

To correct the lateral chromatic aberration, astigmatism and distortion the second lens unit produces, the first lens unit is provided with a positive lens at the position closest to the first conjugate point. Since this positive lens takes its place where the off-axial principal ray is incident on the first lens unit at a large height "ha". By this arrangement, the reversed aberrations to those of the second lens unit are produced to effect good correction of aberrations.

To suppress the distortion and coma to a minimum, a negative lens closest to the first conjugate point in the first lens unit is formed to the meniscus shape convex toward the first conjugate point. Also, to correct well the spherical aberration and longitudinal chromatic aberration, that part of the first lens unit which is nearer to the second conjugate point is constructed with inclusion of at least one positive lens and one cemented lens composed of a positive lens and a negative lens.

Letting the focal lengths of the first and second lens units be denoted by f1 and f2, respectively, the interval between the principal points of the first and second lens units be denoted by e12, the distance from the last lens surface of the first lens unit to the cross point of the off-axial principal ray with the optical axis be denoted by L1, and the separation between the first and second lens units be denoted by DL, the following conditions are satisfied:

$$0.5 < f1/f < 2.1 \quad (2)$$

$$1.3 < f2/f < 3.8 \quad (3)$$

$$0.2 < e12/f < 1.4 \quad (4)$$

$$0.3 < L1/f < 1.7 \quad (5)$$

$$1.5 < DL/f < 4.9 \quad (6).$$

The technical significance of each of the conditions (2) to (6) is described below.

The inequalities of condition (2) give a range for the ratio of the focal length of the first lens unit to the focal length of the entire projecting optical system. In a range below the lower limit of the condition (2), as this means that the focal length of the first lens unit is too short, the back focal distance of the first lens unit to the second conjugate point cannot be made large. As a result, the separation between the first and second lens units cannot be made long enough. In another range above the upper limit of the condition (2), the total length of the projecting optical system increases objectionably.

The inequalities of condition (3) give a range for the ratio of the focal length to the first lens unit to the focal length of the entire projecting optical system. In a range below the lower limit of the condition (3), as this means that the refractive power of the second lens unit is too strong, it becomes difficult to correct the aberrations the second lens unit produces by any design of the first lens unit. In another range above the upper limit of the condition (3), the degree of parallelism (telecentric property) of the rays entering the second conjugate plane becomes objectionably poor.

The inequalities of condition (4) give a range for the ratio of the interval between the principal points of the first and second lens units to the focal length of the entire projecting optical system. In a range below the lower limit of the condition (4), the separation between the first and second lens units cannot be made long enough. In another range above the upper limit of the condition (4), the total length of the projecting optical system increases objectionably.

The inequalities of condition (5) give a range for the ratio of the distance L1 of from the last lens surface of the first lens unit to the cross point of the off-axial principal ray with the optical axis to the focal length of the entire projecting optical system. In a range below the lower limit of the condition (5), as this means that the aforesaid distance L1 is too short, it becomes difficult to dispose the mirrors of the color separating system and of the color combining system. In another range above the upper limit of the condition (5), as this means that the aforesaid distance L1 is too large, it results in that the diameter of the first lens unit increases objectionably.

The inequalities of condition (6) give a range for the ratio of the separation between the first and second lens units to the focal length of the entire projecting optical system. In a range below the lower limit of the condition (6), as this means that the aforesaid separation is too short and that, as a result, the separation between the cross point of the off-axial principal ray with the optical axis and the second lens unit is too short, the degree of parallelism of the rays entering the second conjugate plane become poor. In another range above the upper limit of the condition (6), the total length of the projecting optical system increases objectionably.

According to the invention, it is particularly preferable to alter the ranges of the conditions (2) to (6) as follows:

$$0.7 < f1/f < 1.9 \quad (2a)$$

$$1.5 < f2/f < 3.5 \quad (3a)$$

$$0.3 < e12/f < 1.2 \quad (4a)$$

$$0.4 < L1/f < 1.5 \quad (5a)$$

$$1.8 < DL/f < 4.5 \quad (6a).$$

Further, letting the Abbe number of the material of the positive lens closest to the first conjugate point in the first lens unit be denoted by v1f, and the Abbe number of the material of the one positive lens in the second lens unit be denoted by v2f, it is preferable to satisfy the following condition:

$$0.6 < v1f/v2f < 1.5 \quad (7)$$

The inequalities of condition (7) give a range for the ratio of the Abbe number of the positive lens closest to the first conjugate point in the first lens unit to the Abbe number of the one positive lens in the second lens unit. Out of the range of the condition (7), it becomes difficult to correct lateral chromatic aberration.

To further improve the correction of chromatic aberrations, it is preferable to alter the numeral range of the condition (7) as follows:

$$0.7 < v1f/v2f < 1.35 \quad (7a)$$

Also, an aspheric surface is applied to the negative lens of meniscus form convex toward the first conjugate point in the first lens unit.

Next, a projection apparatus using the projecting optical system according to the invention is described with reference to FIGS. 11 to 15. Referring to FIGS. 11 to 15, white light emitted from a light source 1, after having been reflected by a reflection mirror 2, becomes a parallel light beam, which is then separated into three colors of blue (B), green (G) and red (B) by a diffraction grating 3 for color separation. These three light beams of different colors emerging at different angles from the diffraction grating 3 are collected by a collection lens 4 and are reflected by high-reflection mirrors 5, 6 and 7. Of these, the light reflected by the high-reflection mirror 5 (blue light beam) is guided to a plano-convex lens 10 through a high-reflection mirror 8 to illuminate a liquid crystal panel 13 for a blue image of the reflection type as the image modulating element.

The light reflected by the high-reflection mirror 6 (green light beam) is guided to a plano-convex lens 11 to illuminate a liquid crystal panel 14 for a green image of the reflection type.

The light reflected by the high-reflection mirror 7 (red light beam) is guided to a plano-convex lens 12 through a high-reflection mirror 9 to illuminate a liquid crystal panel 15 for a red image of the reflection type. Here, each of the plano-convex lenses 10, 11 and 12 corresponds to the second lens unit constituting a part of the projecting optical system. Also, the elements 1 to 9 constitute a part of the illuminating system.

Figure 14:
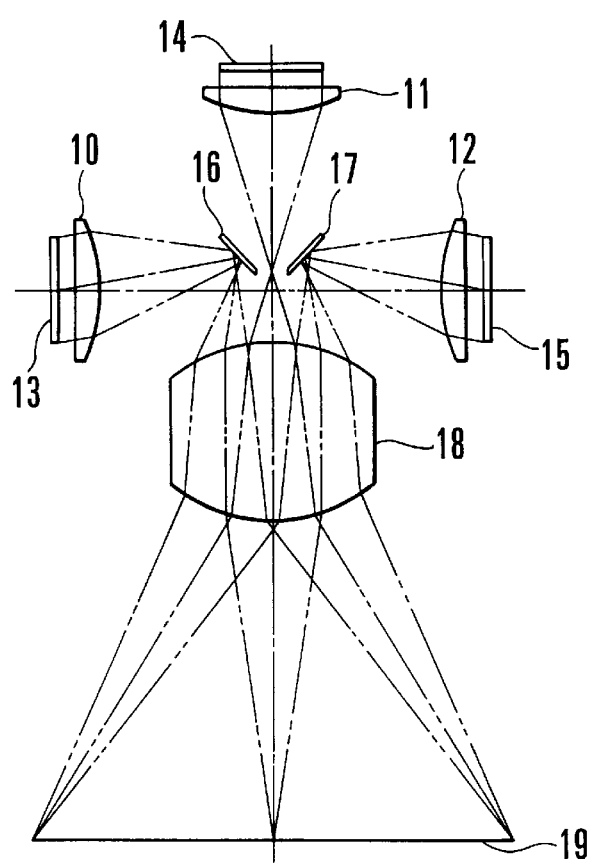
FIG. 14 is a bottom view of the main parts of the first embodiment of the projection apparatus according to the invention.
Figure 15:
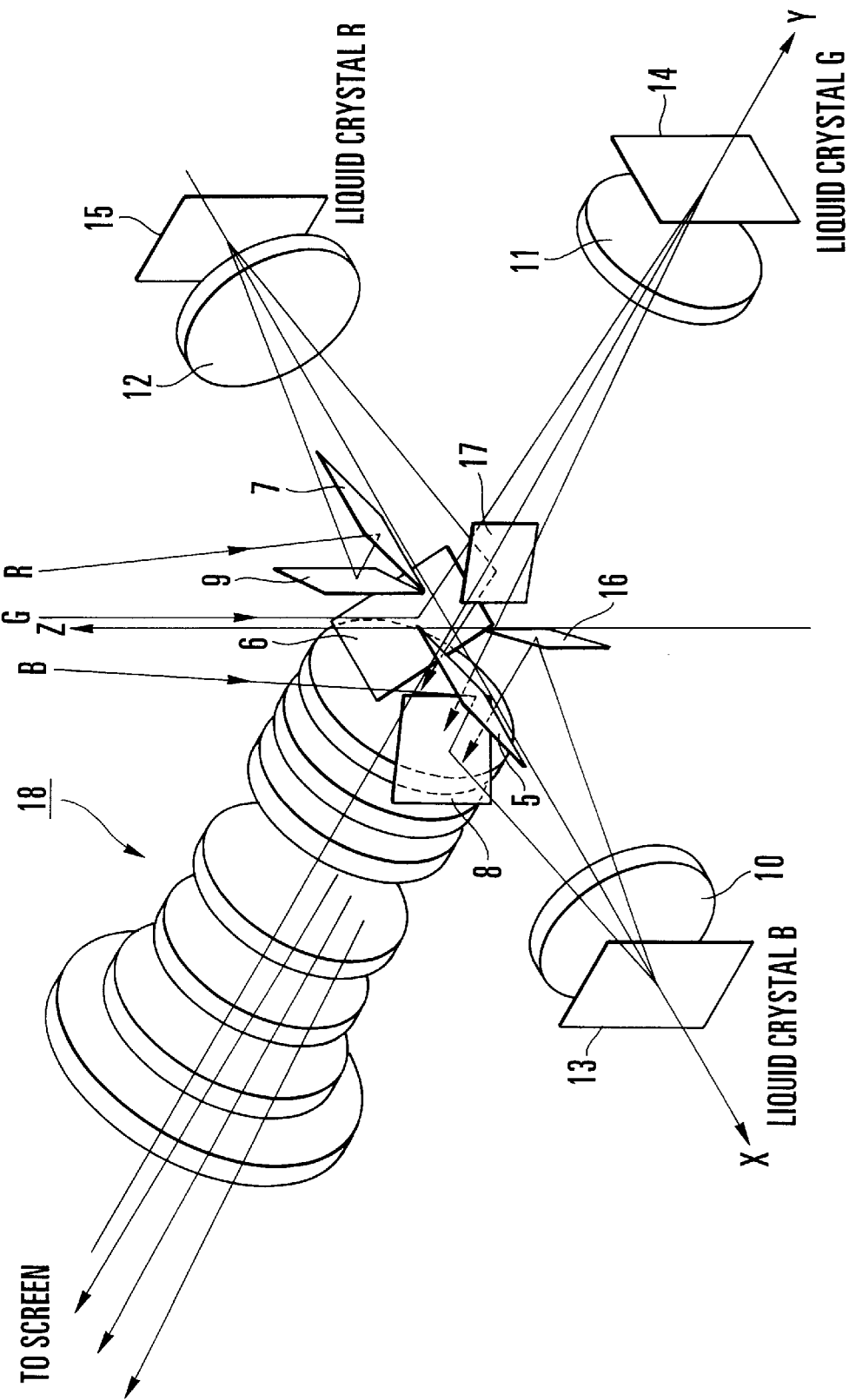
FIG. 15 is a perspective view of the main parts of the first embodiment of the projection apparatus according to the invention.
Figure 16:
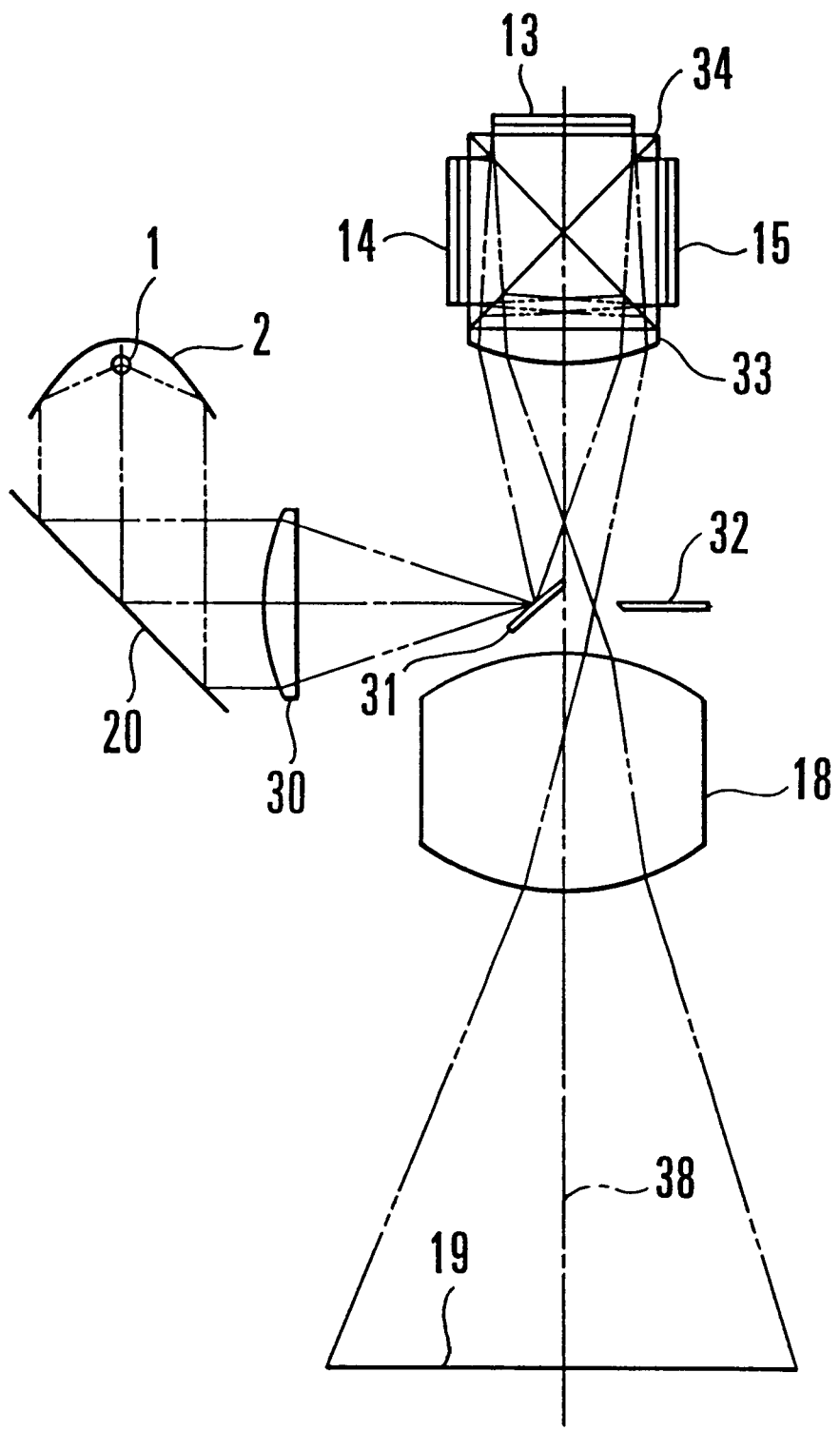
FIG. 16 is a schematic diagram of the main parts of the conventional projection apparatus using the reflection-type liquid crystal display device.

Next, light reflected by the liquid crystal panel 13 is collected by the plano-convex lens 10 as shown in FIG. 14 and is reflected by the high-reflection mirror 16. The light reflected by the high-reflection mirror 16 is guided to a lens unit 18. Accordingly, an original image displayed on the liquid crystal panel 13 is thus projected by the lens unit 18 onto a screen 19. Similarly, light reflected by the liquid crystal panel 15 is guided through the plano-convex lens 12 and the high-reflection mirror 17 to the lens unit 18.

Accordingly, an original image displayed on the liquid crystal panel 15 is thus projected by the lens unit 18 onto the screen 19. An original image displayed on the liquid crystal panel 14 is likewise guided through the plano-convex Lens 11 and is projected by the lens unit 18 onto the screen 19.

Figure 12:
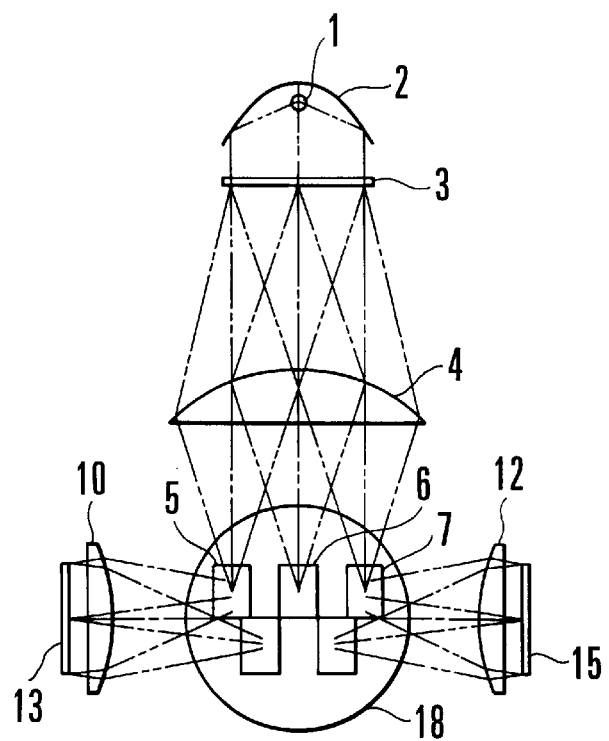
FIG. 12 is a back view of the main parts of the first embodiment of the projection apparatus according to the invention.
Figure 13:
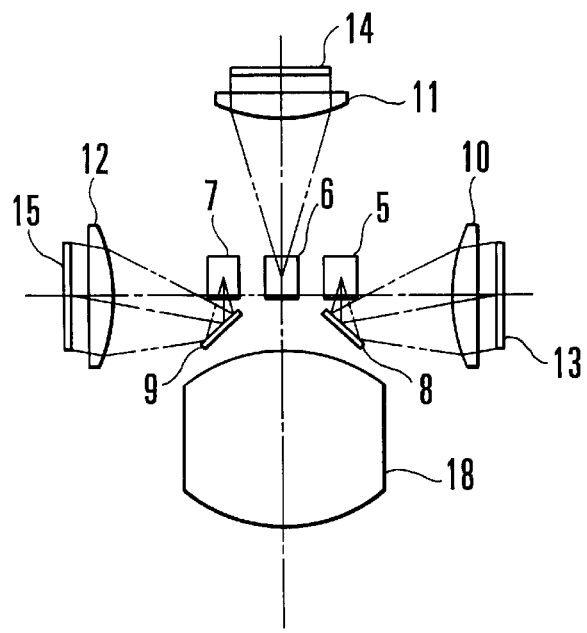
FIG. 13 is a top view of the main parts of the first embodiment of the projection apparatus according to the invention.

The mirrors 5, 6 and 7 are, as shown in FIG. 12, disposed in the neighborhood of an entrance pupil of the lens unit 18 in one of two semi-circles into which the entrance pupil is divided.

The mirrors 16 and 17 are disposed in the neighborhood of the entrance pupil of the lens unit 18 in the one of the two semi-circles of the entrance pupil which is opposite to that in which the mirrors 5, 6 and 7 are disposed, so as to divide the area of the entrance pupil. The mirrors 16 and 17 constitute a part of the image combining means. The mirrors 5 to 9 constitute a part of the color separating system.

The liquid crystal panels 13, 14 and 15 are illuminated from slant directions with respect to the optical axes of the plano-convex lenses 10, 11 and 12 by the parallel light beams, respectively. The central rays of the light beams from the liquid crystal panels 13 and 15 through the mirrors 16 and 17 are incident on, and the central ray of the light beam from the liquid crystal panel 14 is directly incident on, the lens unit 18 from the slant directions at the one of the semi-circles of the entrance pupil. Here, the lens unit 18 corresponds to the first lens unit constituting a part of the projecting optical system.

Here, in the liquid crystal panels 13, 14 and 15, the image modulation is performed depending on the individual colors. On the screen 19, therefore, an image is projected with full colors.

It will be appreciated from the foregoing that in the present embodiment, the diffraction grating is used as the color separating means, and a plurality of mirrors 5 to 9, 16 and 17 are appropriately arranged on the image side of the lens unit 18 to project the liquid crystal panels 13 to 15 of different colors onto the screen 19 with a high optical performance.

Next, numerical examples 1 to 5 of the projecting optical system of the invention are shown. In the numerical data for the examples 1 to 5, ri is the radius of curvature of the i-th lens surface, when counted from the first conjugate point side, di is the i-th lens thickness or air separation, when counted from the first conjugate point side, and ni and vi are respectively the refractive index and Abbe number of the glass of the i-th lens element, when counted from the first conjugate point side. The values of the factors in the above-described conditions (1) to (7) for the numerical examples 1 to 5 are listed in Table-1.

The shape of an aspheric surface is expressed in the coordinates with an X axis in the axial direction and a Y axis in the direction perpendicular to an optical axis, the direction in which light advances being made as positive, by the following equation:

$$X = \frac{(1/R)Y^2}{1+\sqrt{1-(1+K)(Y/R)^2}} + AY^2 + BY^4 + CY^6 + DY^8 + EY^{10} + FY^{12} + GY^{14}$$

where R is the radius of the osculating sphere, and K, B, C, D, E, F and G are the aspheric coefficients.

Also, it is to be noted that the notation "E-0X" means "$\times 10^{-X}$".

| Numerical Example 1: | | | |
|---|---|---|---|
| f = 25.02 | Fno = 1:2.2 | | $2\omega = 55.8°$ |
| r1 = 113.11 | d1 = 11.90 | n1 = 1.51633 | ʋ1 = 64.2 |
| r2 = −267.29 | d2 = 0.20 | | |
| r3 = 41.99 | d3 = 3.00 | n2 = 1.49171 | ʋ2 = 57.4 |
| r4 = 23.96 | d4 = 15.97 | | |
| r5 = −45.36 | d5 = 2.00 | n3 = 1.69680 | ʋ3 = 55.5 |
| r6 = 77.27 | d6 = 15.50 | | |
| r7 = 719.44 | d7 = 2.00 | n4 = 1.69680 | ʋ4 = 55.5 |
| r8 = 35.11 | d8 = 10.63 | | |
| r9 = 60.86 | d9 = 6.70 | n5 = 1.84666 | ʋ5 = 23.8 |
| r10 = −1926.28 | d10 = 41.00 | | |
| r11 = −1394.67 | d11 = 2.60 | n6 = 1.84666 | ʋ6 = 28.8 |
| r12 = 49.85 | d12 = 15.50 | n7 = 1.62299 | ʋ7 = 58.2 |
| r13 = −55.38 | d13 = 0.20 | | |
| r14 = 64.70 | d14 = 7.00 | n8 = 1.60311 | ʋ8 = 60.7 |
| r15 = −708.40 | d15 = 25.00 | | |
| r16 = (Stop) | d16 = 59.00 | | |
| r17 = 32.36 | d17 = 6.50 | n9 = 1.51633 | ʋ9 = 64.2 |
| r18 = ∞ | | | |

Aspheric Surface: r3
K = 1.143 E − 01 A = 0          B = 1.214 E − 07
C = 2.197 E − 09 D = −6.275 E − 12    E = 8.438 E − 15
F = −9.00 E − 18 G = 4.502 E − 21
Aspheric Surface: r17
K = −2.304

| Numerical Example 2: | | | |
|---|---|---|---|
| f = 25.68 | Fno = 1:2.2 | | $2\omega = 54.6°$ |
| r1 = 93.07 | d1 = 13.45 | n1 = 1.51633 | ʋ1 = 64.2 |
| r2 = −276.19 | d2 = 0.20 | | |
| r3 = 40.68 | d3 = 2.50 | n2 = 1.51633 | ʋ2 = 64.2 |
| r4 = 24.91 | d4 = 15.54 | | |
| r5 = −44.69 | d5 = 2.00 | n3 = 1.60311 | ʋ3 = 60.7 |
| r6 = 39/17 | d6 = 24.07 | | |
| r7 = 2312.97 | d7 = 2.00 | n4 = 1.72000 | ʋ4 = 50.3 |
| r8 = 42.57 | d8 = 6.41 | | |
| r9 = 58.23 | d9 = 7.21 | n5 = 1.84666 | ʋ5 = 23.8 |
| r10 = −1483.94 | d10 = 33.20 | | |
| r11 = −563.75 | d11 = 2.20 | n6 = 1.84666 | ʋ6 = 23.8 |
| r12 = 51.81 | d12 = 15.57 | n7 = 1.60311 | ʋ7 = 60.7 |
| r13 = −52.61 | d13 = 0.20 | | |
| r14 = 67.19 | d14 = 8.05 | n8 = 1.60311 | ʋ8 = 60.7 |
| r15 = −260.05 | d15 = 25.00 | | |
| r16 = (Stop) | d16 = 59.00 | | |
| r17 = 30.46 | d17 = 6.50 | n9 = 1.51633 | ʋ9 = 64.2 |
| r18 = ∞ | | | |

Aspheric Surface: r3
K = −7.184 E − 02    B = −4.873 E − 08    C = 2.024 E − 09
D = −4.224 E − 12    E = 1.956 E − 15    F = 6.161 E − 19
G = −2.087 E − 21
Aspheric Surface: r17
K = −2.304

| Numerical Example 3: | | | |
|---|---|---|---|
| f = 24.74 | Fno = 1:2 | | $2\omega = 56.3°$ |
| r1 = 80.59 | d1 = 14.80 | n1 = 1.51633 | ʋ1 = 64.2 |
| r2 = −635.78 | d2 = 0.20 | | |

-continued

| | | | |
|---|---|---|---|
| r3 = 50.74 | d3 = 3.20 | n2 = 1.60311 | υ2 = 60.7 |
| r4 = 28.56 | d4 = 14.22 | | |
| r5 = −81.18 | d5 = 2.50 | n3 = 1.60311 | υ3 = 60.7 |
| r6 = 28.33 | d6 = 9.73 | | |
| r7 = −2841.95 | d7 = 6.00 | d4 = 1.51633 | υ4 = 64.2 |
| r8 = −49.86 | d8 = 10.06 | | |
| r9 = −45.19 | d9 = 2.00 | n5 = 1.78590 | υ5 = 44.2 |
| r10 = 45.19 | d10 = 3.50 | | |
| r11 = 65.34 | r11 = 8.50 | n6 = 1.84666 | υ6 = 23.8 |
| r12 = −65.34 | d12 = 8.90 | | |
| r13 = −27.75 | d13 = 9.95 | n7 = 1.60311 | υ7 = 60.7 |
| r14 = −31.43 | d14 = 14.20 | | |
| r15 = −171.95 | d15 = 2.50 | n8 = 1.84666 | υ8 = 23.8 |
| r16 = 46.32 | d16 = 11.80 | n9 = 1.69680 | υ9 = 55.5 |
| r17 = −64.70 | d17 = 0.20 | | |
| r18 = 97.85 | d18 = 6.55 | n10 = 1.69680 | υ10 = 55.5 |
| r19 = −129.69 | d19 = 15.00 | | |
| r20 = (Stop) | d20 = 59.00 | | |
| r21 = 32.36 | d21 = 8.00 | n11 = 1.51633 | υ11 = 64.2 |
| r22 = ∞ | | | |

Numerical Example 4:

f = 25.09   Fno = 1:2   2ω = 55.7°

| | | | |
|---|---|---|---|
| r1 = 72.79 | d1 = 15.99 | n1 = 1.51633 | υ1 = 64.2 |
| r2 = −3217.30 | d2 = 0.20 | | |
| r3 = 43.77 | d3 = 3.20 | n2 = 1.60311 | υ2 = 60.7 |
| r4 = 26.20 | d4 = 15.73 | | |
| r5 = −83.17 | d5 = 2.50 | n3 = 1.60311 | υ3 = 60.7 |
| r6 = 30.55 | d6 = 8.46 | | |
| r7 = 769.54 | d7 = 4.96 | n4 = 1.51633 | υ4 = 64.2 |
| r8 = −76.21 | d8 = 8.46 | | |
| r9 = −63.48 | d9 = 2.00 | n5 = 1.60311 | υ5 = 60.7 |
| r10 = 30.55 | d10 = 8.25 | | |
| r11 = 192.19 | d11 = 7.38 | n6 = 1.84666 | υ6 = 23.8 |
| r12 = −56.72 | d12 = 20.05 | | |
| r13 = −38.40 | d13 = 9.21 | n7 = 1.51633 | υ7 = 64.2 |
| r14 = −30.39 | d14 = 0.18 | | |
| r15 = −169.63 | d15 = 2.50 | n8 = 1.84666 | υ8 = 23.8 |
| r16 = 49.37 | d16 = 12.03 | n9 = 1.60311 | υ9 = 60.7 |
| r17 = −68.72 | d17 = 0.20 | | |
| r18 = 98.74 | r18 = 7.54 | n10 = 1.60311 | υ10 = 60.7 |
| r19 = −98.74 | d19 = 15.00 | | |
| r20 = (Stop) | d20 = 58.93 | | |
| r21 = 32.28 | d21 = 8.00 | n11 = 1.51633 | υ11 = 64.2 |
| r22 = ∞ | | | |

Numerical Example 5:

f = 26.59   Fno = 1:2.8   2ω 53°

| | | | |
|---|---|---|---|
| r1 = 55.49 | d1 = 11.40 | n1 = 1.51633 | υ1 = 64.2 |
| r2 = −65.34 | d2 = 0.20 | | |
| r3 = 35.72 | d3 = 2.50 | n2 = 1.60311 | υ2 = 60.7 |
| r4 = 20.79 | d4 = 11.42 | | |
| r5 = −65.39 | d5 = 2.00 | n3 = 1.60311 | υ3 = 60.7 |
| r6 = 20.73 | d6 = 16.65 | | |
| r7 = 347.32 | d7 = 2.00 | n4 = 1.65844 | υ4 = 50.9 |
| r8 = 38.75 | d8 = 5.50 | | |
| r9 = 50.34 | d9 = 8.10 | n5 = 1.84666 | υ5 = 23.8 |
| r10 = −95.65 | d10 = 15.32 | | |
| r11 = −67.06 | d11 = 2.20 | n6 = 1.84666 | υ6 = 23.8 |
| r12 = 37.19 | d12 = 13.31 | n7 = 1.60311 | υ7 = 60.7 |
| r13 = −31.85 | d13 = 0.20 | | |
| r14 = 70.68 | d14 = 5.37 | n8 = 1.60311 | υ8 = 60.7 |
| r15 = −182.39 | d15 = 15.00 | | |
| r16 = (Stop) | d16 = 54.93 | | |
| r17 = 30.03 | d17 = 8.00 | n9 = 1.51633 | υ9 = 64.2 |
| r18 = ∞ | | | |

TABLE-1

| | Numerical Example | | | | |
|---|---|---|---|---|---|
| Condition | 1 | 2 | 3 | 4 | 5 |
| (1) D2f / f | 0.503 | 0.481 | 0.698 | 0.718 | 0.621 |
| (2) f1 / f | 1.198 | 1.207 | 1.303 | 1.324 | 1.311 |
| (3) f2 / f | 2.505 | 2.298 | 2.533 | 2.492 | 2.187 |
| (4) e12 / f | 0.701 | 0.731 | 0.536 | 0.517 | 0.631 |
| (5) L1 / f | 0.999 | 0.973 | 0.606 | 0.598 | 0.564 |
| (6) DL / f | 3.357 | 3.271 | 2.990 | 2.946 | 2.629 |
| (7) v1f / v2f | 1 | 1 | 1 | 1 | 1 |

FIGS. 17A, 17B and 17C are a sectional view of the main parts, a top view of the main parts and a fragmentary view in enlarged scale of the main parts, respectively, of a second embodiment of the projection apparatus according to the invention. White light emitted from a light source 101 disposed at a first focus of an elliptic mirror 102 is collected and reflected by the elliptic mirror 102 toward a second focus of the elliptic mirror 102, entering a concave lens 103. The rays of light become an almost parallel light beam in passing through the concave lens 103, entering a first prism 104 of stepped form. The entrance surface of the first prism 104 has a diffraction grating 104a for color separation formed therein to separate the incident light by angles into a plurality of color light beams (three color light beams) of different wavelength regions.

Of the plurality of color light beams separated out by the diffraction grating 104a, only the red light beam (R) of the first wavelength region is totally reflected by the exit surface 104b of the first prism 104 toward a mirror 108, by which it is reflected toward a condenser lens 111. The blue light beam (B) of the second wavelength region and the green light beam (G) of the third wavelength region exit from the exit surface 104b and enter a second prism 105 of stepped form at an entrance surface 105a thereof.

Of the light beams incident on the entrance surface 105a of the second prism 105, the blue light beam (B) of the second wavelength region is totally reflected by the exit surface 105b toward a mirror 107, from which it advances to a condenser lens 109. The green light beam (G) of the third wavelength region exits from the exit surface 105b and enters a third prism 106 of stepped form at an entrance surface 106a thereof.

It is to be noted that, for the second prism 105, its inner wall has been formed in a stepped shape. The reason for this is to reduce the weight of the second prism 105. Instead of this, it is also possible to apply a triangular prism.

The green light beam (G) entering the third prism 106 at the entrance surface 106a exits from the exit surface 106b and advances to a condenser lens 110.

It should be noted that in the second embodiment, the third prism 106 may be omitted. Since, in this case, the central axis of the green light beam (G) exiting from the second prism 105 orients to a slant direction, the condenser lens 110 and the other elements that follow can be arranged along this direction.

In the second embodiment, white light emitted from the light source 101 is separated into three color light beams by the diffraction grating 104 a for color separation, which are then made to enter the respective condenser lenses 109, 110 and 111.

After having been once collected by the condenser lenses 109, 110 and 111, the color light beams then enter condenser lenses 112, 113 and 114 and then illuminate image modulating elements 115, 116 and 117, which are made of the liquid crystal of the reflection type for the respective wavelength regions. The light beams from the image modulating elements 115, 116 and 117 pass through the condenser lenses 112, 113 and 114 again and advance to projection lenses 118, 119 and 120, by which the images for the respective wavelength regions are projected onto a screen (not shown) in such a way as to coincide with one another.

In the second embodiment, as described above, the incident light is separated by the diffraction grating into three color light beams, which illuminate the respective image modulating elements. The images displayed on the image modulating elements are projected by the projecting optical system onto the screen. A color projected image is thus formed.

FIGS. 18A and 18B are a top view of the main parts and a fragmentary view in enlarged scale of the main parts, respectively, of a third embodiment of the projection apparatus according to the invention. The third embodiment differs from the second embodiment shown in FIGS. 17A to 17C in that, instead of the reflection-type image modulating elements, transmission-type image modulating elements 122, 123 and 124 are employed. The other constituent parts are substantially the same. The elements from the light source 101 to the condenser lenses 109, 110 and 111 are the same as those shown in FIGS. 17A to 17C.

In the third embodiment, the image modulating elements 122, 123 and 124 corresponding to the blue light (B), green light (G) and red light (R) are disposed just behind the condenser lenses 109, 110 and 111, so that they are illuminated by the respective color light beams. The images displayed on the image modulating elements 122, 123 and 124 with the individual color light beams are projected by the respective projecting optical systems 125, 126 and 127 onto the screen in coincident relation to one another. It is to be noted that even in the third embodiment, the third prism 106 of stepped form may be omitted likewise as in the second embodiment.

It will be appreciated from the foregoing that, in the projection apparatus according to the second and third embodiments shown in FIGS. 17A to 17C and FIGS. 18A and 18B, white light is separated into three color light beams of high saturation by the diffraction grating without the use of the cross dichroic mirrors. The image modulating elements are thus efficiently illuminated by the respective color light beams.

The images of the original colors are then projected by the respective projecting optical systems onto the screen in coincident relation to one another, thus forming a color image of good quality.

According to the invention, as described above, the appropriate rules of lens design are set forth to easily obtain the desired back focal distance. Despite the telecentric form of the image-side section, the asymmetric aberrations are corrected well. Thus, it is possible to achieve a projecting optical system suited to the projection apparatus (for example, color liquid crystal projector).

Also, the illuminating means for the liquid crystal panels or the like original images to be projected is appropriately designed to achieve a projection apparatus which has a high optical performance in projecting the original images onto the screen.

I claim:

1. A projecting optical system comprising, in order from a first conjugate point of a longer distance, a first lens unit of positive refractive power of retrofocus type and a second lens unit consisting of one positive lens, wherein parameters of said projecting optical system are determined such that an off-axial principal ray crosses an optical axis between said first lens unit and said second lens unit, and the following condition is satisfied:

$$0.2 < D2f/f < 0.95 \tag{1}$$

where $D2f$ is a distance from a vertex of a lens surface facing the first conjugate point of said second lens unit to a second conjugate point of a shorter distance, and $f$ is a focal length of said projecting optical system.

2. A projecting optical system according to claim 1, wherein said one positive lens in said second lens unit is a plano-convex lens having a convex surface facing the first conjugate point.

3. A projecting optical system according to claim 1, wherein said one positive lens in said second lens unit is provided with an aspheric surface of such shape that a positive refractive power becomes progressively weaker from a center thereof toward a margin thereof.

4. A projecting optical system according to claim 1, wherein a lens surface facing the first conjugate point of said one positive lens in said second lens unit is hyperboloidal.

5. A projecting optical system according to claim 1, wherein said first lens unit comprises, in order from the first conjugate point, a positive lens, a negative lens of meniscus form convex toward the first conjugate point, a negative lens of which both surfaces are concave, a negative lens having a concave surface facing the second conjugate point, a positive lens, a cemented lens consisting of a negative lens and a positive lens and having an overall positive refractive power, and a positive lens.

6. A projecting optical system according to claim 1, wherein said first lens unit comprises, in order from the first conjugate point, a positive lens, a negative lens of meniscus form convex toward the first conjugate point, a negative lens of which both surfaces are concave, a positive lens, a negative lens of which both surfaces are concave, a positive lens of which both surfaces are convex, a lens having a convex surface facing the second conjugate point, a cemented lens consisting of a negative lens and a positive lens and having an overall positive refractive power, and a positive lens.

7. A projecting optical system according to claim 1, wherein, letting focal lengths of said first lens unit and said second lens unit be denoted by f1 and f2, respectively, an interval between principal points of said first lens unit and said second lens unit be denoted by e12, a distance from the last lens surface of said first lens unit to a cross point of the off-axial principal ray with the optical axis be denoted by L1, and a separation between said first lens unit and said second lens unit be denoted by DL, the following conditions are satisfied:

$$0.5 < f1/f < 2.1$$

$$1.3 < f2/f < 3.8$$

$$0.2 < e12/f < 1.4$$

$$0.3 < L1/f < 1.7$$

$$1.5 < DL/f < 4.9.$$

8. A projecting optical system according to claim 1, wherein, letting an Abbe number of a material of a positive lens included in said first lens unit which is closest to the first conjugate point be denoted by v1f, and an Abbe number of a material of said one positive lens in said second lens unit be denoted by v2f, the following condition is satisfied:

$0.6 < \nu 1f/\nu 2f < 1.5$.

9. A projecting optical system according to claim 1, wherein a negative lens of meniscus form convex toward the first conjugate point included in said first lens unit is provided with an aspheric surface.

10. A projection apparatus using said projecting optical system according to claim 1 to project an image onto a predetermined plane.

11. A projecting optical system comprising, in order from a first conjugate point of a longer distance, a first lens unit of positive refractive power of retrofocus type and a second lens unit consisting of one positive lens, wherein parameters of said projecting optical system are determined such that an off-axial principal ray crosses an optical axis between said first lens unit and said second lens unit, and said second lens unit is provided with at least one aspheric surface.

12. A projecting optical system according to claim 11, wherein said one positive lens in said second lens unit is a plano-convex lens having a convex surface facing the first conjugate point.

13. A projecting optical system according to claim 11, wherein said one positive lens in said second lens unit is provided with an aspheric surface of such shape that a positive refractive power becomes progressively weaker from a center thereof toward a margin thereof.

14. A projecting optical system according to claim 11, wherein a lens surface facing the first conjugate point of said one positive lens in said second lens unit is hyperboloidal.

15. A projecting optical system according to claim 11, wherein said first lens unit comprises, in order from the first conjugate point, a positive lens, a negative lens of meniscus form convex toward the first conjugate point, a negative lens of which both surfaces are concave, a negative lens having a concave surface facing the second conjugate point, a positive lens, a cemented lens consisting of a negative lens and a positive lens and having an overall positive refractive power, and a positive lens.

16. A projecting optical system according to claim 11, wherein said first lens unit comprises, in order from the first conjugate point, a positive lens, a negative lens of meniscus form convex toward the first conjugate point, a negative lens of which both surfaces are concave, a positive lens, a negative lens of which both surfaces are concave, a positive lens of which both surfaces are convex, a lens having a convex surface facing the second conjugate point, a cemented lens consisting of a negative lens and a positive lens and having an overall positive refractive power, and a positive lens.

17. A projecting optical system according to claim 11, wherein, letting focal lengths of said first lens unit and said second lens unit be denoted by f1 and f2, respectively, an interval between principal points of said first lens unit and said second lens unit be denoted by e12, a distance from the last lens surface of said first lens unit to a cross point of the off-axial principal ray with the optical axis be denoted by L1, a separation between said first lens unit and said second lens unit be denoted by DL, and a focal length of said projecting optical system be denoted by f, the following conditions are satisfied:

$0.5 < f1/f < 2.1$ $1.3 < f2/f < 3.8$ $0.2 < e12/f < 1.4$ $0.3 < L1/f < 1.7$ $1.5 < DL/f < 4.9$.

18. A projecting optical system according to claim 11, wherein, letting an Abbe number of a material of a positive lens included in said first lens unit which is closest to the first conjugate point be denoted by $\nu 1f$, and an Abbe number of a material of said one positive lens in said second lens unit be denoted by $\nu 2f$, the following condition is satisfied:

$0.6 < \nu 1f/\nu 2f < 1.5$.

19. A projecting optical system according to claim 11, wherein a negative lens of meniscus form convex toward the first conjugate point included in said first lens unit is provided with an aspheric surface.

20. A projection apparatus using said projecting optical system according to claim 11 to project an image onto a predetermined plane.

21. A projecting optical system comprising:

a light source;

a first optical element having a diffracting portion for separating light from said light source into three color light beams, and a total reflection surface for totally reflecting one color light beam of the three color light beams separated out by said diffracting portion;

a second optical element for totally reflecting one of the other color light beams which have exited from said first optical element and for transmitting the remaining color light beam; and image modulating elements respectively disposed in optical paths of the three color light beams having exited from said first optical element and said second optical element.

22. A projecting optical system according to claim 21, further comprising:

a projection lens for projecting light beams modulated by said image modulating elements.

* * * * *

UNITED STATES PATENT AND TRADEMARK OFFICE
CERTIFICATE OF CORRECTION

PATENT NO. : 5,969,875
DATED : October 19, 1999
INVENTOR(S) : Saburo Sugawara

It is certified that error appears in the above-identified patent and that said Letters Patent is hereby corrected as shown below:

Title page, Abstract:
Item [57] Line 8, "0.95<" should read -- 0.95 --.

Column 1:
Line 17, "apparatus" should read -- apparatuses --.

Column 8:
Line 50, "red (B)" should read -- red (R) --.

Column 9:
Line 17, "Lens" should read -- lens --.
Line 67, "made" should read -- taken --.

Column 10:
Line 45 (Numerical Example 2), "r6=39/17" should read -- r6=39.17 --.

Column 11:
Line 5 (Numerical Example 3), "r6=28.33" should read -- r6=28.77 --.
Line 6 (Numerical Example 3), "d4=1.51633" should read -- n4=1.51633 --.
Line 10 (Numerical Example 3), "r11=8.50" should read -- d11=8.50 --.
Line 40 (Numerical Example 4), "r18=7.54" should read -- d18=7.54 --.

Signed and Sealed this

Twenty-fifth Day of September, 2001

Attest:

*Nicholas P. Godici*

NICHOLAS P. GODICI
*Attesting Officer*    Acting Director of the United States Patent and Trademark Office